United States Patent
Radic (12)

(10) Patent No.: US 11,095,228 B2
(45) Date of Patent: *Aug. 17, 2021

(54) INTEGRATED SELF-DRIVEN ACTIVE CLAMP

(71) Applicant: Appulse Power Inc., Toronto (CA)

(72) Inventor: Aleksandar Radic, Toronto (CA)

(73) Assignee: Appulse Power Inc., Toronto (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/913,489

(22) Filed: Jun. 26, 2020

(65) Prior Publication Data
US 2020/0328688 A1    Oct. 15, 2020

Related U.S. Application Data

(63) Continuation of application No. 16/145,819, filed on Sep. 28, 2018, now Pat. No. 10,707,766.

(60) Provisional application No. 62/625,691, filed on Feb. 2, 2018.

(51) Int. Cl.
*H02M 3/335* (2006.01)
*H02M 1/34* (2007.01)

(52) U.S. Cl.
CPC ......... *H02M 3/33592* (2013.01); *H02M 1/34* (2013.01); *H02M 2001/342* (2013.01)

(58) Field of Classification Search
CPC ............... H02M 3/33592; H02M 1/34; H02M 2001/342
See application file for complete search history.

(56) References Cited

U.S. PATENT DOCUMENTS

| 5,455,757 A | 10/1995 | Nguyen et al. |
| 5,796,595 A | 8/1998 | Cross |
| 6,069,803 A | 5/2000 | Cross |

(Continued)

FOREIGN PATENT DOCUMENTS

| CN | 100525045 C | 8/2009 |
| CN | 102208873 A | 10/2011 |

(Continued)

OTHER PUBLICATIONS

International Search Report dated Apr. 26, 2019 for PCT Patent Application No. PCT/IB2018/060252.

(Continued)

*Primary Examiner* — Fred E Finch, III
*Assistant Examiner* — Kevin H Sprenger
(74) *Attorney, Agent, or Firm* — MLO, a professional corp.

(57) ABSTRACT

An active clamp circuit includes an active clamp capacitor coupled in series with an active clamp switch and an active clamp controller circuit to receive an active clamp switch current that passes through the active clamp switch and to control the active clamp switch based on the received active clamp switch current. The active clamp controller circuit is configured to enable the active clamp switch based on a first amplitude comparison, the first amplitude comparison being based on the active clamp switch current. The active clamp controller circuit is configured to disable the active clamp switch based on a second amplitude comparison and a third amplitude comparison, the second amplitude comparison and the third amplitude comparison being based on the active clamp switch current.

18 Claims, 12 Drawing Sheets

(56) References Cited

U.S. PATENT DOCUMENTS

| | | | |
|---|---|---|---|
| 6,452,818 B1* | 9/2002 | Simopoulos | H02M 3/33592 363/21.06 |
| RE38,196 E | 7/2003 | Vinciarelli et al. | |
| 7,606,051 B1 | 10/2009 | Wittenbreder | |
| 8,358,518 B2 | 1/2013 | Yang et al. | |
| 9,246,391 B2 | 1/2016 | Berghegger | |
| 10,673,342 B1 | 6/2020 | Tzeng | |
| 2003/0179592 A1 | 9/2003 | Nishiyama et al. | |
| 2005/0201128 A1 | 9/2005 | Jin et al. | |
| 2005/0285661 A1 | 12/2005 | Wittenbreder | |
| 2006/0013021 A1 | 1/2006 | Aso | |
| 2006/0062026 A1 | 3/2006 | Wittenbreder | |
| 2007/0195560 A1 | 8/2007 | Yasumura | |
| 2007/0263415 A1 | 11/2007 | Jansen et al. | |
| 2008/0123374 A1 | 5/2008 | Vinciarelli | |
| 2008/0315858 A1* | 12/2008 | Hong | H02M 3/33569 323/351 |
| 2009/0073725 A1 | 3/2009 | Lin | |
| 2011/0194313 A1 | 8/2011 | Yoshinaga | |
| 2014/0185333 A1 | 7/2014 | Yang | |
| 2014/0233275 A1 | 8/2014 | Yang et al. | |
| 2014/0268914 A1 | 9/2014 | Wang et al. | |
| 2015/0003121 A1 | 1/2015 | Yang et al. | |
| 2015/0263639 A1* | 9/2015 | Russell | H02M 3/33592 363/126 |
| 2015/0318788 A1 | 11/2015 | Kovacic et al. | |
| 2015/0357904 A1 | 12/2015 | Odell et al. | |
| 2016/0072399 A1 | 3/2016 | Kikuchi et al. | |
| 2016/0099647 A1 | 4/2016 | Zhang et al. | |
| 2016/0226389 A1 | 8/2016 | Quaglino et al. | |
| 2016/0365801 A1 | 12/2016 | Phadke | |
| 2017/0070152 A1 | 3/2017 | Liu | |
| 2017/0288528 A1 | 10/2017 | McCoy et al. | |
| 2018/0115252 A1 | 4/2018 | Chang et al. | |
| 2018/0175725 A1 | 6/2018 | Hu et al. | |
| 2018/0226895 A1 | 8/2018 | Song et al. | |
| 2018/0254710 A1 | 9/2018 | Wang et al. | |
| 2018/0287481 A1 | 10/2018 | Liu et al. | |
| 2018/0294735 A1 | 10/2018 | Song et al. | |
| 2019/0044449 A1 | 2/2019 | Li et al. | |
| 2019/0044450 A1 | 2/2019 | Muto et al. | |
| 2019/0052174 A1 | 2/2019 | Gong | |
| 2019/0131963 A1 | 5/2019 | Gong et al. | |
| 2019/0149052 A1 | 5/2019 | Gong et al. | |
| 2019/0149054 A1 | 5/2019 | Shimura et al. | |
| 2020/0007041 A1 | 1/2020 | Liu et al. | |
| 2020/0112261 A1 | 4/2020 | Strijker | |
| 2020/0227995 A1 | 7/2020 | Radic | |
| 2020/0366214 A1 | 11/2020 | Radic | |

FOREIGN PATENT DOCUMENTS

| | | | |
|---|---|---|---|
| CN | 103795260 A | 5/2014 | |
| CN | 108683336 A | 10/2018 | |
| CN | 108683336 B | 10/2019 | |
| JP | 2009290932 A | 12/2009 | |
| JP | 2014143209 A | 8/2014 | |
| KR | 20160125676 A | 11/2016 | |
| KR | 20170106204 A | 9/2017 | |
| KR | 20170108869 A | 9/2017 | |
| TW | 201315118 A | 4/2013 | |
| WO | 2016171325 A1 | 10/2016 | |
| WO | 2017095408 A1 | 6/2017 | |

OTHER PUBLICATIONS

International Search Report dated May 31, 2019 for PCT Patent Application No. PCT/IB2019/050686.
Notice of Allowance dated Apr. 17, 2019 for U.S. Appl. No. 16/221,945.
Notice of Allowance dated Apr. 3, 2020 for U.S. Appl. No. 16/569,924.
Notice of Allowance dated Feb. 7, 2020 for U.S. Appl. No. 16/401,980.
Notice of Allowance dated Jul. 3, 2019 for U.S. Appl. No. 16/247,227.
Notice of Allowance dated Mar. 6, 2020 for U.S. Appl. No. 16/145,819.
Office Action dated Jul. 29, 2019 for U.S. Appl. No. 16/145,819.
Office Action dated May 31, 2019 for U.S. Appl. No. 16/247,227.
Office Action dated Oct. 3, 2019 for U.S. Appl. No. 16/401,980.
Office Action dated Jul. 30, 2020 for U.S. Appl. No. 16/665,237.
Notice of Allowance dated Jan. 5, 2021 for Taiwanese Patent application No. 107145962.
Office Action dated Nov. 4, 2020 for U.S. Appl. No. 16/665,237.
International Search Report dated Jul. 27, 2020 for PCT Patent Application No. PCT/IB2020/053739.
Official Letter and Search Report dated Aug. 5, 2020 for Taiwan Patent application No. 107145962.
Notice of Allowance and Fees dated Jun. 17, 2021 for U.S. Appl. No. 16/889,194.

* cited by examiner

INTEGRATED SELF-DRIVEN ACTIVE CLAMP

RELATED APPLICATIONS

This application is a continuation of U.S. patent application Ser. No. 16/145,819, filed on Sep. 28, 2018, which claims priority to U.S. Provisional Patent Application No. 62/625,691, filed on Feb. 2, 2018, and entitled "Integrated Adaptive Active Clamp," all of which are hereby incorporated by reference for all purposes.

BACKGROUND

Switch-mode power supplies (SMPS) are power management components in modern electronic devices. They provide, among other things, power efficient and galvanically isolated power to multiple loads. To achieve high power processing efficiency and/or galvanic isolation, conventionally one or more magnetically coupled elements, semiconductor switches and associated gate driver circuits are required.

The magnetically coupled elements often suffer from non-trivial leakage inductance phenomena, which necessitate the need for affordable voltage snubber circuits to control the semiconductor switch peak drain-to-source voltages. Because of the price-sensitive nature of SMPS, the snubber circuits are conventionally limited to the cost-effective passive and power lossy resistor-capacitor-diode (RCD) configurations.

In systems sensitive to power losses and heat generation, the dissipation in lossy components in the form of heat is unsuitable. Thus, recycling of energy using an active clamping configuration within the system provides an opportunity for system form-factor reduction and power efficiency improvement.

Additionally, clamping the maximum drain-source voltages of switching power transistors allows for increased device reliability and use of power transistors with improved figure-of-merit (FOM). The improved FOM enables the SMPS to operate at higher switching frequency while maintaining high power processing efficiency. Furthermore, it allows for a reduction of the SMPS reactive component size and cost.

SUMMARY

In some embodiments, an active clamp circuit includes an active clamp capacitor coupled in series with an active clamp switch and an active clamp controller circuit. The active clamp controller circuit receives an active clamp switch current that passes through the active clamp switch and controls the active clamp switch based on the received active clamp switch current. The active clamp controller circuit is configured to enable the active clamp switch based on a first amplitude comparison, the first amplitude comparison being based on the active clamp switch current. The active clamp controller circuit is configured to disable the active clamp switch based on a second amplitude comparison and a third amplitude comparison, the second amplitude comparison and the third amplitude comparison being based on the active clamp switch current.

In some embodiments, an apparatus includes a power converter circuit to convert an input voltage from a voltage source to an output voltage. The power converter circuit includes a transformer which has a primary winding and a secondary winding, a first winding node of the primary winding being coupled to the voltage source to receive the input voltage. The apparatus includes a main switch that is coupled to a second winding node of the primary winding to control a current through the primary winding, and an active clamp circuit to clamp a voltage at the second winding node of the primary winding. The active clamp circuit includes: i) a series circuit combination of an active clamp capacitor coupled in series to an active clamp switch, the series circuit combination being coupled in parallel with the primary winding, and ii) an active clamp controller circuit to receive an active clamp switch current that passes through the active clamp switch and to control the active clamp switch based on the active clamp switch current. The active clamp controller circuit is configured to enable the active clamp switch based on a first amplitude comparison, the first amplitude comparison being based on the active clamp switch current. The active clamp controller circuit is configured to disable the active clamp switch based on a second amplitude comparison and a third amplitude comparison, the second amplitude comparison and the third amplitude comparison being based on the active clamp switch current.

DETAILED DESCRIPTION

Figure 1:
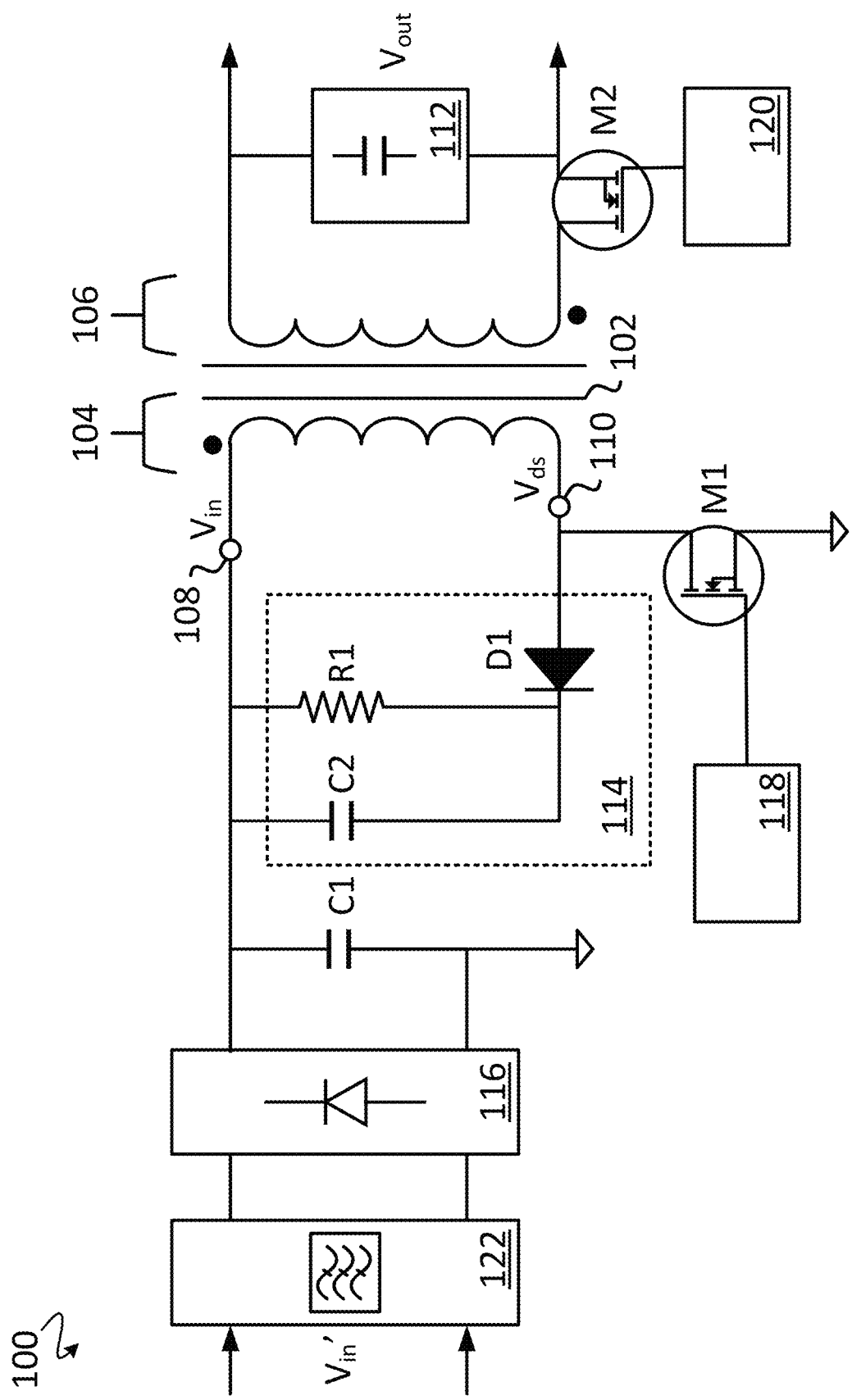
FIG. 1 is a simplified circuit schematic of a conventional power converter.

Some embodiments described herein provide a self-driven active clamp circuit and self-driven active clamping methods for use in a power converter that converts an input voltage to an output voltage using a transformer. In some embodiments, the self-driven active clamp described herein replaces a diode of a resistor-capacitor-diode (RCD) snubber circuit of a conventional power converter, advantageously converting the conventional power converter into a power converter having self-driven active clamping without needing to change additional control circuits of the power converter (such as a primary-side power management integrated circuit, or a secondary side synchronous switch controller integrated circuit). In other embodiments, the self-driven active clamp circuit is integrated into an initial design of a power converter.

The self-driven active clamp circuit advantageously increases power processing efficiency of a power converter by recycling energy stored in a leakage inductance of the transformer. To further improve light-to-medium power processing efficiency, in some embodiments, the active clamp circuit is advantageously disabled during light-load and low-line operation of the power converter (e.g., when a drain-source voltage of a primary side switch is below a voltage threshold, such as 500V).

In accordance with some embodiments, the self-driven active clamp circuit clamps a primary side peak voltage of a main switch, which enables the power converter to utilize primary side and/or secondary side switches having a lower voltage rating, leading to reduced power losses during switch conduction and/or switching. In some embodiments, the self-driven active clamp circuit turns on when a body-diode of an active clamp field effect transistor (FET) switch of the self-driven active clamp circuit begins conducting (e.g., a source-drain current of the switch is flowing through the switch) and turns off when near a second zero crossing of the source-drain current through the switch. Thus, an on-time of the self-driven active clamp circuit can be advantageously reduced as compared to conventional active clamp solutions because the active clamp switching does not need to coincide with a main switch turn-on time. As a result, a smaller active clamp capacitor can be utilized as compared to conventional clamping circuits because the active clamp circuit resonant period is shorter. Because the active clamp capacitor is a high voltage component, using a smaller capacitance can result in significant cost reduction benefits.

At light loads, zero-voltage-switching is conventionally difficult to achieve using conventional active clamp circuits because the period between main switch turn-on times is significantly longer. Embodiments of the self-driven active clamp circuit described herein allow for near zero-voltage-switching of the main switch on the primary side of the power converter across a wide range of output load currents, without the need for accurate modulation of the transformer magnetizing inductance current value. Such embodiments induce a low-amplitude resonant magnetizing inductance current, via discharging of the active clamp capacitor, which amplifies the quasi-resonant voltage amplitude. This advantageously results in near zero-voltage switching of the main-switch during quasi-resonant operation at the first valley, and significantly reduced main switch turn-on voltage at second and higher valleys.

A further advantage of the self-driven active clamp circuit described herein is a significantly lower active clamp RMS current (e.g., reduction of up to 10×), as compared to conventional active clamp zero-voltage-switching methods. This enables the self-driven active clamp circuit to utilize an active clamp switch having a higher RDSON (drain-source on-resistance) as compared to conventional active clamp circuits, resulting in an active clamp circuit which is lower cost, easier to integrate, and having a smaller physical size than conventional active clamp circuits.

FIG. 1 is a simplified circuit schematic of a conventional power converter ("converter") 100. Some elements of the power converter 100 have been omitted from FIG. 1 to simplify the description of power converter 100 but are understood to be present. A voltage source $V_{in}'$ is received at the converter 100. $V_{in}'$ can be provided either as an alternating current (AC) or direct current (DC). An input side of the converter 100 generally includes an input voltage filter block 122, a rectifier block 116 (in the case of AC input), an input voltage buffer capacitor C1, an RCD snubber circuit block 114 (which includes a capacitor C2, a resistor R1 and a diode D1), a main switch M1, and a main switch controller circuit ("controller") 118. The input voltage filter block 122, rectifier block 116 and the input buffer capacitor C1 provide a filtered, buffered, rectified, or otherwise conditioned input voltage $V_{in}$ to a transformer 102.

The transformer 102 transfers power from the input side of the converter 100 to an output side of the converter 100 and generally includes a primary winding 104 with a first node 108 and a second node 110, and a secondary winding 106. The output side of the converter 100 generally includes an output buffer circuit 112, a synchronous rectifier switch M2, a synchronous rectifier switch controller circuit ("controller") 120, and a load (not shown).

The first node 108 receives $V_{in}$, and the second node 110 is coupled to a terminal of the main switch M1 at the second node 110. The main switch M1 controls a current through the primary winding 104 to charge a magnetizing inductance $L_M$ of the transformer 102 during a first portion of a switching cycle of the converter 100. The synchronous rectifier switch M2 controls a current flow through the secondary winding 106 to discharge the transformer 102 into output buffer circuit 112 and/or a load during a subsequent portion of the switching cycle. In some embodiments, one or both of the main switch M1 and/or the synchronous rectifier switch M2 are field-effect transistors (FETs), each having a drain node, a source node, and a gate node to control a conduction of current between the drain node and the source node. In other embodiments, the synchronous rectifier switch M2 is replaced with a diode.

When the main switch M1 is enabled by the controller 118 during the first portion of a switching cycle, current flows through the primary winding 104 to a voltage bias node such as ground. The current flow through the primary winding 104 causes energy to be stored in the magnetization inductance $L_M$ and a leakage inductance $L_L$ of the transformer 102. When the main switch M1 is disabled in a subsequent portion of the switching cycle, output voltage $V_{out}$ is generated at the output buffer circuit 112 and is provided to a load (not shown). When the main switch M1 is turned off, a reflected voltage ($nV_{out}$) is developed at a drain node of the main switch M1 at node 110. The contribution of the reflected voltage $nV_{out}$ to a drain-source voltage $V_{ds}$ of the main switch M1 at the node 110 is expressed as:

$$V_{ds}=V_{in}+nV_{out} \quad \text{(Equation 1)}$$

where n is a turns ratio of the transformer 102. Energy stored in the leakage inductance $L_L$ of the transformer 102 also contributes to the voltage $V_{ds}$ developed at the node 110.

The RCD snubber circuit 114 prevents the voltage $V_{ds}$ from increasing to a level that damages the main switch M1. As $V_{ds}$ rises, the diode D1 becomes forward biased and current flows into the capacitor C2 and into the resistor R1 to dissipate energy, thereby clamping Vas to a level that is within a safe operating range of the main switch M1. To further increase the efficiency of the converter 100, the diode D1 can be replaced with an actively driven clamp switch driven by an active clamp drive signal. However, conventional active clamping circuits require a control signal or other means of synchronization from the controller 118. Thus, a converter 100 that uses a controller 118 that is not already configured to support conventional active clamping cannot easily be modified to implement active clamping.

Figure 2:
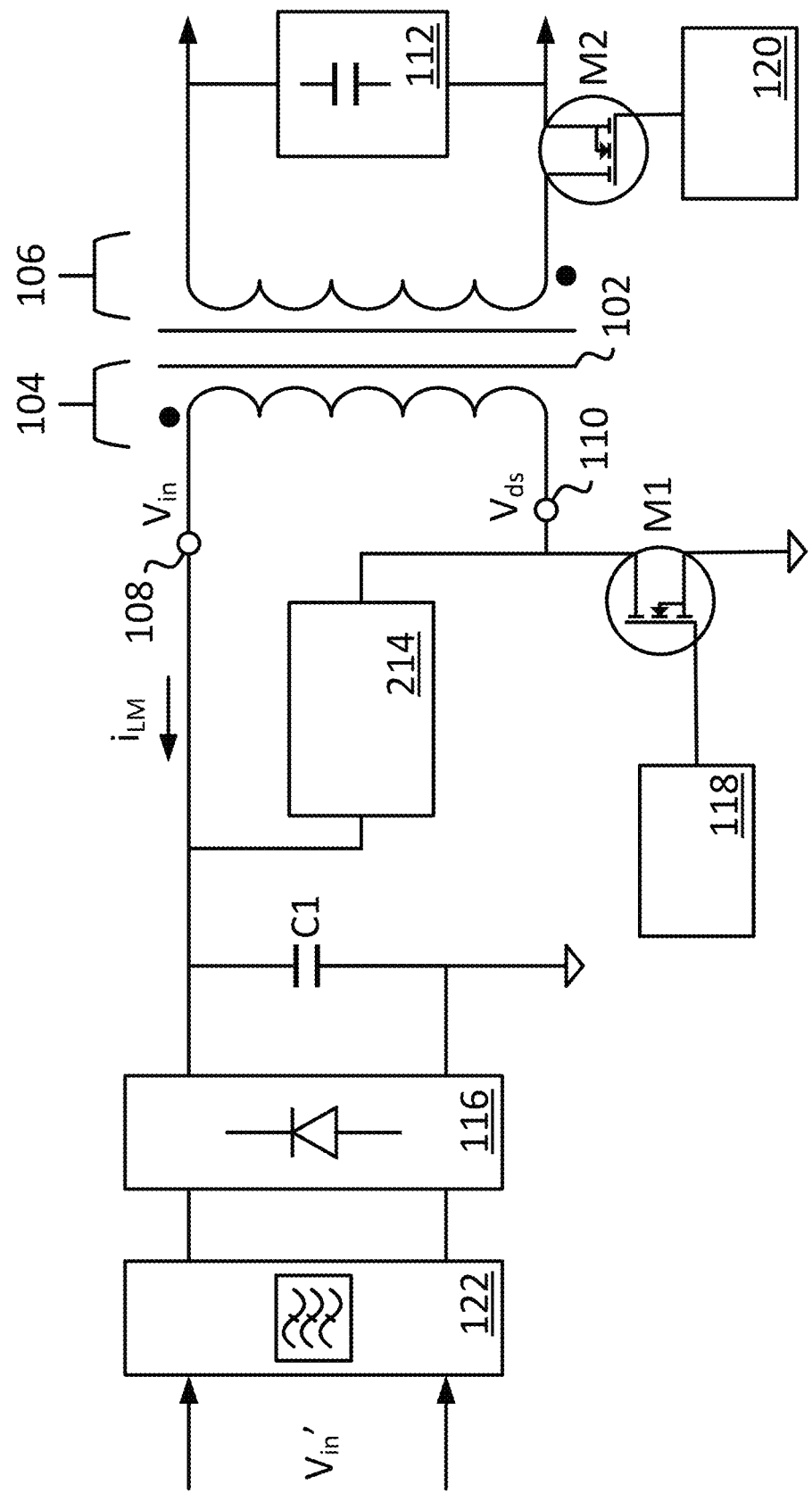
FIG. 2 is a simplified circuit schematic of a power converter with a self-driven active clamp circuit, in accordance with some embodiments.

FIG. 2 is a simplified circuit schematic of a power converter ("converter") 200 with a self-driven active clamp circuit 214, in accordance with some embodiments. Some elements of the power converter 200 have been omitted from FIG. 2 to simplify the description of the power converter 200 but are understood to be present. The converter 200 generally includes the circuit elements discussed with reference to FIG. 1. However, all, or a portion (e.g., the diode D1), of the snubber circuit 114 of the converter 100 has been replaced with the self-driven active clamp circuit ("active clamp circuit") 214. Advantageously, the active clamp circuit 214 can replace the snubber circuit 114 of the converter 100 without making significant modifications to the converter 100 (e.g., it does not require a control signal or other synchronization signal from the controllers 118, 120). Thus, a converter 100 that was manufactured with a snubber circuit similar to the snubber circuit 114 can be modified with the self-driven active clamp circuit 214 to perform active clamping. For example, in some embodiments, the diode D1 of the conventional snubber circuit 114 can be replaced with the self-driven active clamp circuit 214. A magnetizing inductance current $i_{LM}$ flowing out of the primary winding 104 is described later with reference to FIG. 5A.

Figure 3:
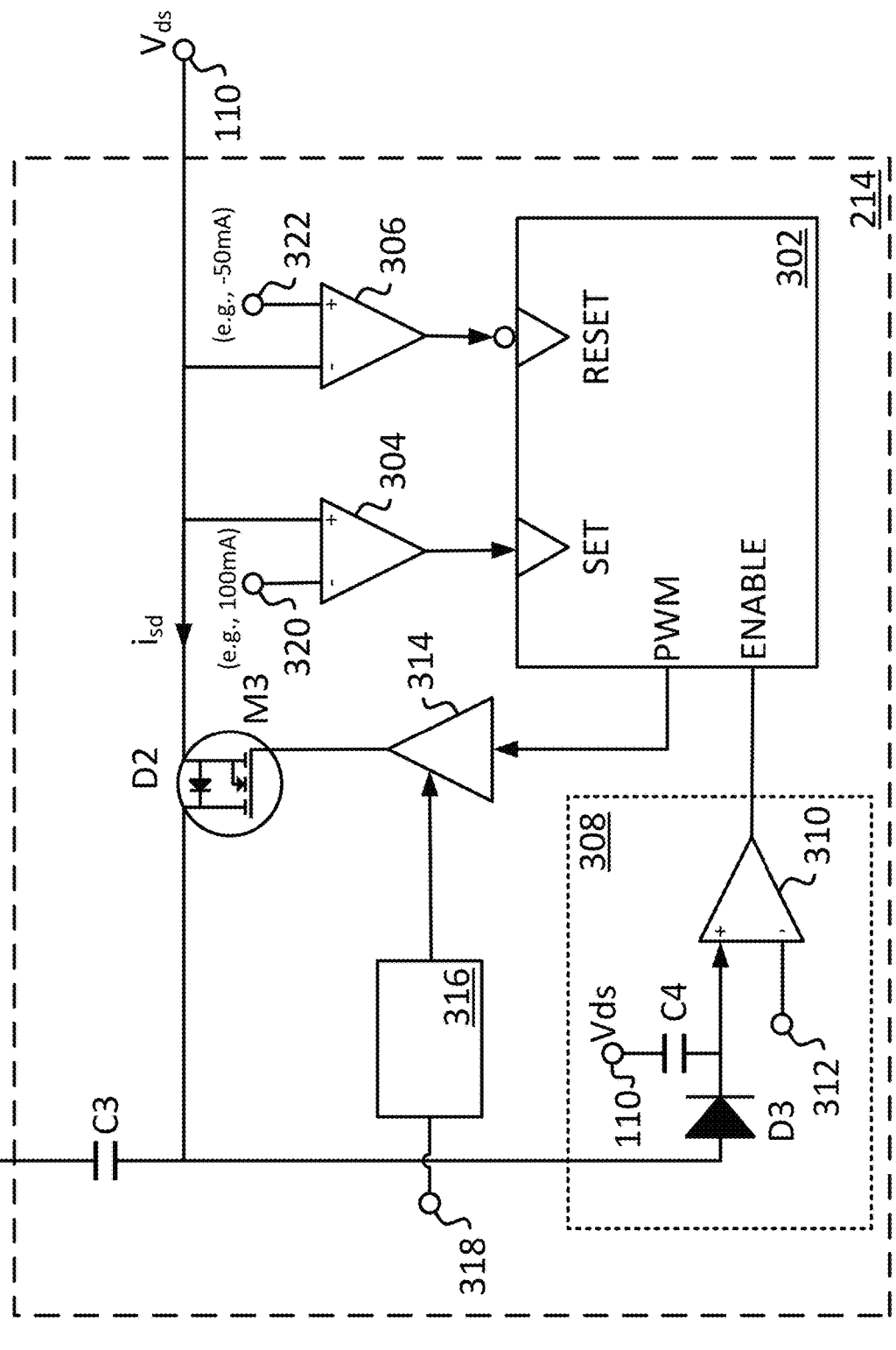
FIG. 3 is a simplified circuit schematic of a self-driven active clamp circuit, in accordance with some embodiments.

FIG. 3 is a simplified circuit schematic of the self-driven active clamp circuit 214 of the converter 200 introduced with reference to FIG. 2, in accordance with some embodiments. Some elements of the self-driven active clamp circuit 214 have been omitted from FIG. 3 to simplify the description of the self-driven active clamp circuit 214 but are understood to be present. The active clamp circuit 214 generally includes an active clamp switch controller circuit 302 which provides an active clamp switch control signal to the active clamp switch M3 via a gate driver circuit 314. The active clamp circuit 214 additionally includes a first current amplitude comparison circuit 304, a second current amplitude comparison circuit 306, a voltage peak detection and enable circuit 308, a voltage source circuit 316 (e.g., an LDO), an active clamp switch M3 having a body-diode D2, and an active clamp capacitor C3. The active clamp capacitor C3 is coupled in a series with the active clamp switch M3, and the series combination of the active clamp capacitor C3 and the active clamp switch M3 are coupled in parallel with the primary winding 104. The first current amplitude comparison circuit 304, the second current amplitude comparison circuit 306, the voltage peak detection and enable circuit 308, and the active clamp switch controller circuit 302 are referred to herein as being of an active clamp controller circuit. The active clamp capacitor C3 can advantageously be of a lower voltage rating as compared to the voltage rating of capacitor C2 of a conventional RCD circuit 114, thus providing cost savings. For example, in an example embodiment, the active clamp capacitor C3 can have a 250V rating as compared to a 630V rating of the capacitor C2. In some embodiments, the resistor R1 of the conventional RCD 114 can advantageously be omitted from the active clamp circuit 214, providing further cost savings.

The voltage source circuit 316 receives a voltage 318 and increases, decreases, or otherwise conditions the voltage 318 to power the gate driver circuit 314 in order to drive (i.e., enable and disable) the active clamp switch M3. In some embodiments, the active clamp switch M3 is a current-bidirectional two-quadrant switch. In some embodiments, the active clamp switch M3 is a field-effect transistor (FET) having a drain node (i.e., a first switch node), a source node (i.e., a second switch node), and a gate node (i.e., a switch control node) to control a conduction of current between the drain node and the source node. The drain node and the source node of the active clamp switch M3 are in a series circuit combination with the active clamp capacitor C3. The gate node of the active clamp switch M3 controls a current between the drain node and the source node of the active clamp switch M3. In some embodiments, the active clamp switch M3 includes a diode, other than a body-diode, which is configured to pass a current between the source node and the drain node (in a first current direction) when the diode is forward biased (e.g., when sufficient voltage is developed across the source and drain of the active clamp switch M3). When the gate node of the active clamp switch M3 is driven by the switch control signal, the active clamp switch M3 passes current bidirectionally (e.g., in the first current direction, and/or a second current direction). In the first current direction, current flows from the primary winding 104, through the active clamp switch M3, and into the active clamp capacitor C3. In the second current direction, current flows from the active clamp capacitor C3, through the active clamp switch M3, and into the primary winding 104.

The voltage peak detection and enable circuit 308 generally includes a voltage comparison circuit 310, a diode D3 and a capacitor C4. The capacitor C4 couples a first input of the voltage comparison circuit 310 to the node 110 to receive the drain-source voltage Vds of the main switch M3. The voltage comparison circuit 310 receives a voltage threshold 312 (e.g., from a voltage source circuit, not shown) at a second input. In some embodiments, the voltage threshold 312 is a voltage level above which the main switch M3 could be damaged. In other embodiments, the voltage threshold 312 is a voltage level that corresponds to a heavy load operation of the converter 200. In still other embodiments, the voltage threshold is a voltage level that corresponds to medium or heavy load operation of the converter 200. The voltage peak detection and enable circuit 308 transmits an enable signal to the active clamp switch controller circuit 302 when a voltage across the main switch M3 is equal to or surpasses the voltage threshold 312. The voltage peak detection and enable circuit 308 transmits a disable signal to the active clamp switch controller circuit 302 when a voltage across the switch M3 does not equal or surpass the voltage threshold 312. Thus, the active clamp switch controller circuit is configured to disable the active clamp switch M3 in response to a voltage amplitude of a voltage developed across the main switch M1 being less than the voltage threshold 312 (e.g., 500 V), irrespective of a current surpassing the first current threshold 320. That is, for as long as the active clamp switch controller circuit 302 receives a de-asserted signal at the ENABLE input, the active clamp switch M3 is disabled and the output PWM signal is not transitioned based on signals received by the active clamp switch controller circuit 302 at the SET and RESET inputs from the current amplitude comparison circuits 304, 306. In contrast, when the voltage comparison signal indicates that the received voltage surpasses the voltage threshold 312 (ENABLE is asserted), the output PWM signal is based on the SET and RESET signals received, by the active clamp switch controller circuit 302, from the current amplitude comparison circuits 304, 306. Thus, in some embodiments, the self-driven active clamp circuit 214 is advantageously disabled during light load operation of the converter 200, further increasing power efficiency.

During a portion of the switching cycle when the main switch M1 and active clamp switch M3 are both off, an active clamp switch current $i_{sd}$ flows from the primary winding 104, through the body-diode D2, to the active clamp capacitor C3. During a subsequent portion of the switching cycle when the main switch M1 is off and the active clamp switch M3 is on, the current $i_{sd}$ oscillates between the active clamp capacitor C3, the magnetizing inductance $L_M$, and other intended or parasitic reactive elements of the converter 200.

At a high level, the active clamp switch M3 is enabled if the current $i_{SD}$ surpasses a first current threshold 320 due to the current $i_{SD}$ flowing from the primary winding 104 to the active clamp capacitor C3 through the body diode D2 of the active clamp switch M3 (e.g., body diode conduction of the D2 is detected). The active clamp switch M3 is disabled if a second zero crossing of the current $i_{SD}$ is detected. A first zero-crossing of the current $i_{SD}$ is determined to have occurred if the current $i_{SD}$ is less than a second current threshold 322, due to the current $i_{SD}$ flowing from the active clamp capacitor C3 into the primary winding 104 through the enabled active clamp switch M3. The second zero-crossing of the current $i_{SD}$ is determined to have occurred if the current $i_{SD}$ is greater than the second current threshold 322 at a later time, due to current flowing from the primary winding 104 to the active clamp capacitor C3 through the enabled active clamp switch M3. Upon determining that the second zero-crossing of the current $i_{SD}$ has occurred, the active clamp switch M3 is disabled.

To elaborate, the first current amplitude comparison circuit 304 receives the current $i_{sd}$ at a first input, receives or generates the first current threshold 320 at a second input (e.g., from a first current source circuit, not shown), compares the received current $i_{sd}$ to the first current threshold 320, and transmits a first comparison signal to a SET input of the active clamp switch controller circuit 302. In some embodiments, the first current threshold 320 is a current amplitude that identifies body-diode conduction of the active clamp switch M3. In some embodiments, the first current threshold 320 is about 50 mA to 250 mA, such as 100 mA. The second current amplitude comparison circuit 306 receives the current $i_{sd}$ at a first input, receives or generates the second current threshold 322 at a second input (e.g., from a second current source circuit, not shown), compares the received current $i_{sd}$ to the second current threshold 322, and transmits second and third comparison signals to a RESET input of the active clamp switch controller circuit 302. In some embodiments, the second current threshold 322 is a current amplitude that identifies a first and second zero-crossing of the current $i_{sd}$, the RESET input of the active clamp switch controller circuit 302 receiving an asserted second comparison signal in response to the second current amplitude circuit 306 detecting the first zero-crossing of the current $i_{sd}$, and receiving a de-asserted third comparison signal in response to the second current amplitude circuit 306 detecting the second zero-crossing of the current $i_{sd}$. In some embodiments, the second current threshold 322 is about −300 mA to 0 mA, such as −50 mA. In some embodiments, the first zero-crossing of the current $i_{sd}$ is determined by the current $i_{sd}$ transitioning across the second current threshold 322 with a negative going slope, and the second zero-crossing of the current $i_{sd}$ is determined by the current $i_{sd}$ transitioning across the second current threshold 322 with a positive going slope.

Figure 4:
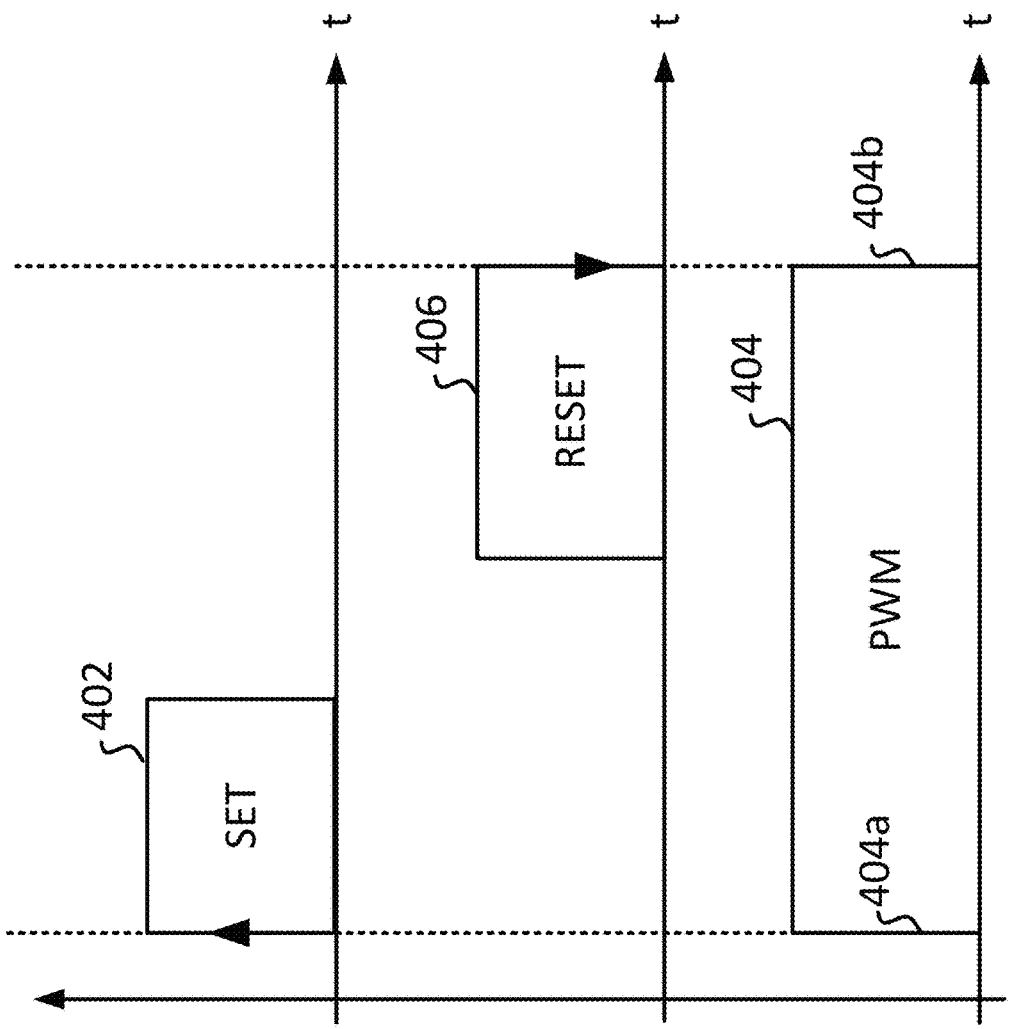
FIG. 4 is a simplified plot of signals related to a self-driven active clamp circuit, in accordance with some embodiments.

Thus, a PWM signal to drive the active clamp switch M3 via the gate driver circuit 314 is generated by the active clamp switch controller circuit 302 based on the comparison result signals received at SET and RESET inputs from the comparison circuits 304, 306. The PWM signal is transmitted to the gate driver circuit 314 to control the active clamp switch M3. FIG. 4 provides an example plot 400 illustrating a relationship between the SET and RESET comparison signals 402, 406 and a resultant PWM signal output 404 of the active clamp switch controller circuit 302, in accordance with some embodiments.

As shown, a rising edge of the SET comparison signal 402 received from the first current amplitude comparison circuit 304 (due to detecting body-diode conduction of M3) triggers a first edge 404a of the PWM signal 404. A falling edge of the SET comparison signal 402 does not cause the PWM signal 404 to change state. Likewise, a rising edge of the RESET comparison signal 406 received from the second current amplitude comparison circuit 306 (due to detecting a first zero-crossing of the current $i_{SD}$) does not cause the PWM signal 404 to change state. However, a falling edge of the RESET comparison signal 406 (due to detecting a second zero-crossing of the current $i_{SD}$) triggers a second edge 404b of the PWM signal 404. Thus, in the embodiment shown, the active clamp switch M3 is enabled when the current $i_{sd}$ surpasses the first current threshold 320 (e.g., when the current $i_{sd}$ is flowing through the body diode D2 to the active clamp capacitor C3). The active clamp switch M3 is disabled when a second zero-crossing of the current $i_{SD}$ is detected (e.g., when the current $i_{sd}$ is resonating due to the magnetizing inductance $L_M$, the active clamp capacitor C3, and other reactive components).

Figure 5:
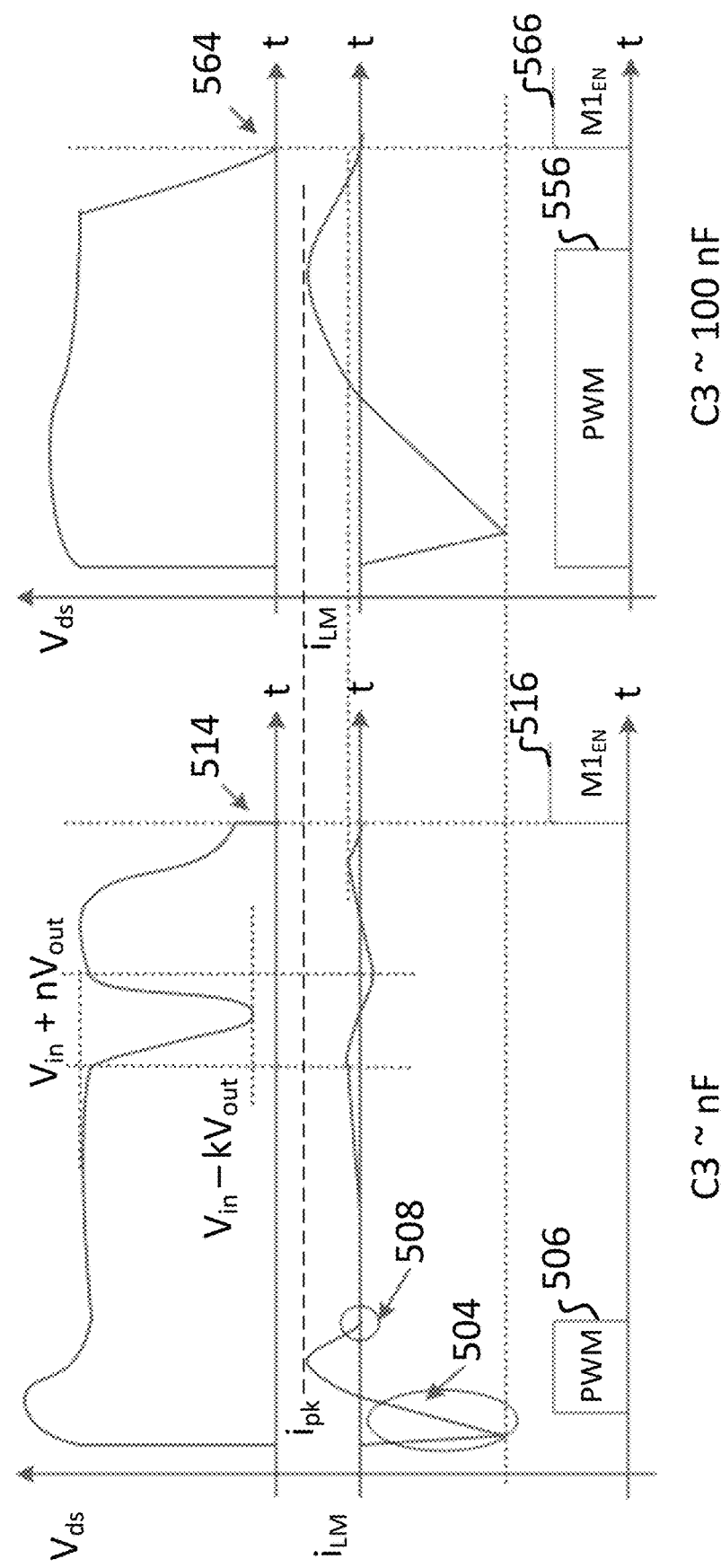
FIG. 5A is a simplified plot of signals related to a power converter with a self-driven active clamp circuit, in accordance with some embodiments.
FIG. 5B is a simplified plot of signals related to a power converter with a conventional clamp circuit.
Figure 7:
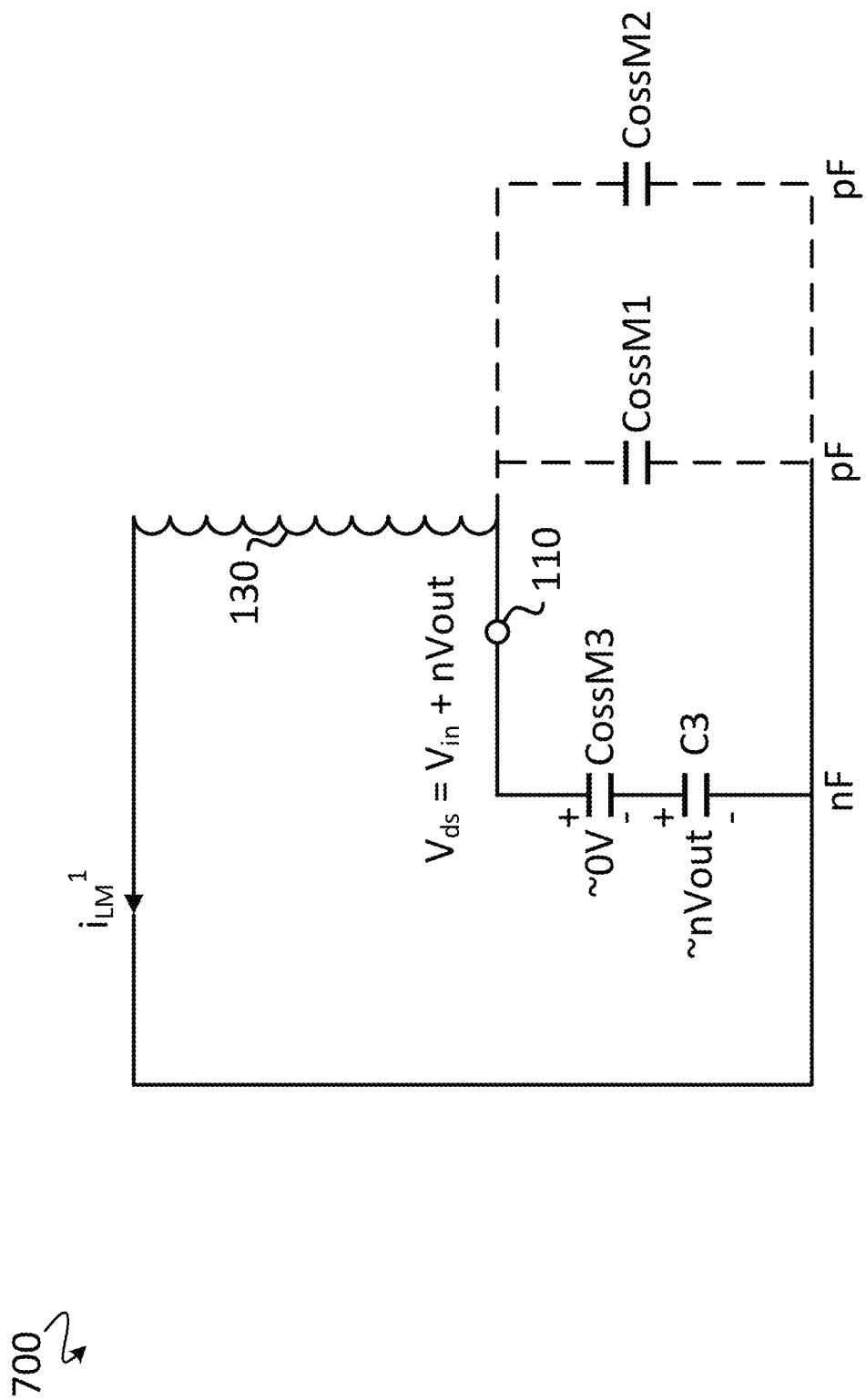
FIG. 7 is a simplified circuit schematic of a portion of a power converter with a self-driven active clamp circuit, in accordance with some embodiments.
Figure 9A:
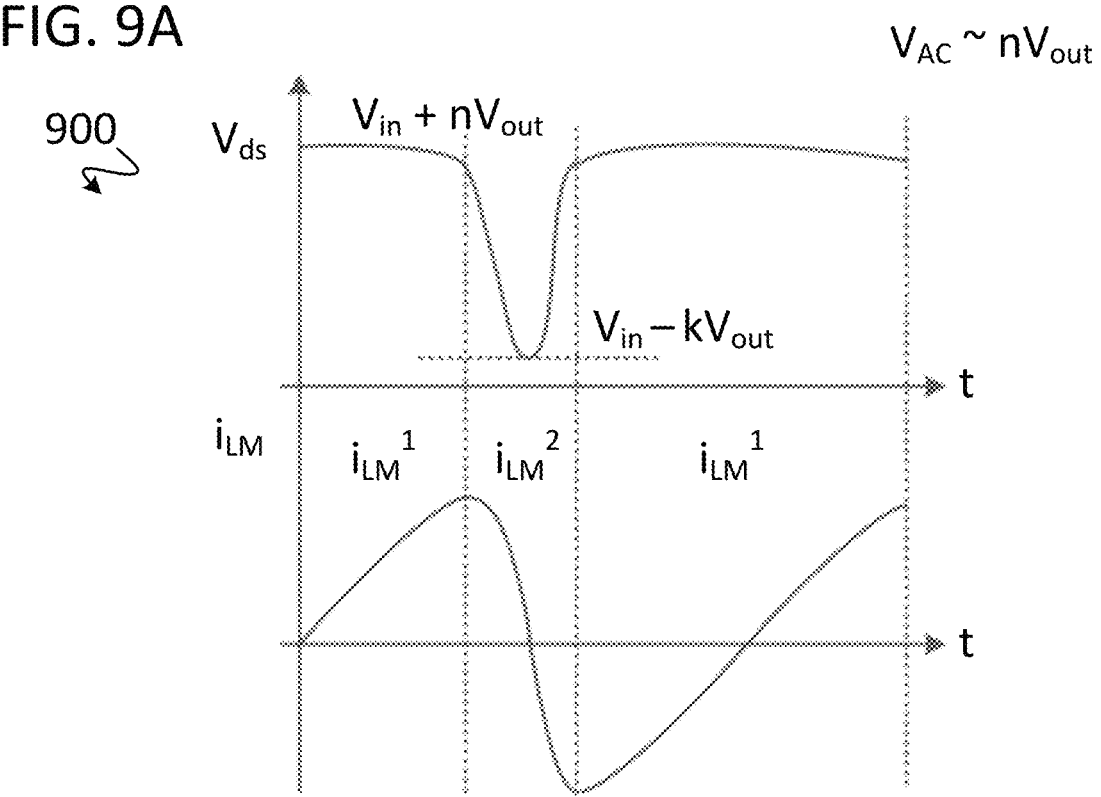
FIG. 9A is a simplified plot of signals related to a power converter with a self-driven active clamp circuit, in accordance with some embodiments.
Figure 9B:
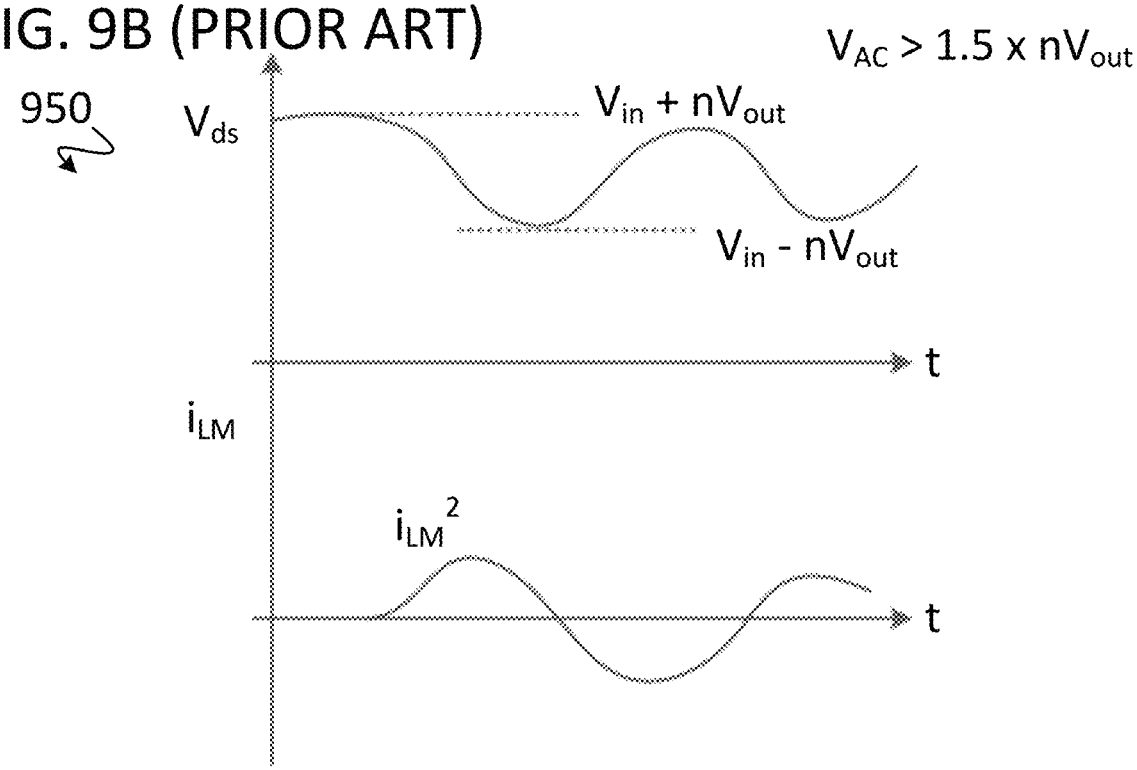
FIG. 9B is a simplified plot of signals related to a power converter with a conventional clamp circuit.

In some embodiments, the converter 200 relies on an indirect resonant mechanism to achieve near zero-voltage turn-switching of the main switch M1. FIG. 5A shows a simplified graph 502 which provides operation details of the converter 200, in accordance with some embodiments. In comparison, FIG. 5B shows a simplified graph 550, which provides operation details of a converter having a conventional active clamp circuit. In both graph 502 and graph 550, the voltage $V_{ds}$ at the node 110 and a current flow $i_{LM}$ of the transformer 102 over time t is shown. The current $i_{LM}$ is shown in graph 502 as having an opposite polarity to that of the current $i_{sd}$ introduced with reference to FIG. 3. As was described with reference to FIG. 3, the active clamp switch M3 enable signal (PWM) 506 is generated in response to an amplitude of the current flow $i_{SD}$ (negative $i_{LM}$). The simplified graph 502 corresponding to the converter 200 illustrates advantageous zero-voltage switching of the active clamp switch M3 at region 504 when the body-diode D2 is conducting, zero-current switching of the active clamp switch M3 at region 508, and near-zero voltage switching of the main switch M1 at region 514. The near-zero voltage switching of the main switch M1 in region 514 is achieved via a second-order effect arising from the operation of the active clamp circuit 214 as described herein. Specifically, when the active clamp circuit 214 is operational, the active clamp capacitor C3 voltage is maintained at a voltage value approximately equal to the reflected output voltage. As a result, at the instant when the converter 200 enters region 514 (quasi-resonant mode) the voltage across the active clamp switch M3 is approximately zero and the equivalent circuit becomes an LC circuit as shown in the simplified circuit schematic 700 of FIG. 7 (L is due to the transformer 102 magnetizing inductance and C is the equivalent capacitance Ceq seen at node 110). Of note is that the equivalent capacitance Ceq as seen at node 110 is dominated by the respective capacitance of the active clamp switch CossM3 and the active clamp capacitor C3 capacitance (as shown in the simplified schematic 700 of FIG. 7), which are in the nF range (several orders of magnitude greater than that of a conventional converter 100 with the RCD snubber circuit block 114). Due to the relatively large equivalent capacitance Ceq, the resonant magnetizing inductance current amplitude, $i_{LM}^1$ (as shown in FIG. 7), is forced to a larger value (as shown in FIG. 9A) as compared to the case where a conventional RCD snubber is utilized and the voltage at the clamp capacitor is significantly larger than the reflected output voltage (as shown in FIG. 9B). The peak magnetizing inductance current can be approximated according to the well-known LC resonant conservation of energy equation, $$L_m \cdot i_{LM1}^2 = C_{eq} \cdot v_{ds}^2 \quad \text{(Equation 2)},$$

where Ceq is the equivalent capacitance at node 110 and $i_{LM1}$ is a magnetizing inductance current (shown in FIG. 7 as $i_{LM}^1$). Because the amplitude of the magnetizing inductance current is forced to a higher value initially, and because the equivalent capacitance Ceq as seen at node 110 falls to pF range once the main switch M1 drain-source voltage begins to fall (a simplified schematic 800 of an equivalent circuit at this point is shown in FIG. 8), the voltage value at the valleys is forced to a lower voltage value (e.g., 2-3× time less as compared to a conventional RCD circuit).

Furthermore, a width of the PWM pulse 506 is significantly and advantageously shorter than a PWM pulse 556 corresponding to a conventional active clamp with zero-voltage switching of the main switch M1 at region 564. An RMS current $i_{rms}$ of the graph 502 is significantly less than an RMS current $i_{rms}$ of the graph 550, due to the peak currents being of the same amplitude $i_{pk}$ but the resonant period (and duty-ratio D, of the on-time/switching period) of the graph 502 being an order of magnitude less than graph 550, as given by the equation, $$i_{rms}^2 = i_{pk}^2 \cdot \frac{D}{3}, \quad \text{(Equation 3)}$$

thus, a smaller active clamp capacitor C3 (on the order of nanofarads) can be used, as compared to a conventional active clamp circuit which may require an active clamp capacitor being on the order of hundreds of nanofarads. Based on the near zero voltage crossing at region 514, the main switch M1 is switched on (e.g., resulting in pulse M1$_{EN}$ 516) when voltage V$_{ds}$ at node 110 is equal to V$_{in}$−knV$_{out}$, where k is an integer value.

Figure 6:
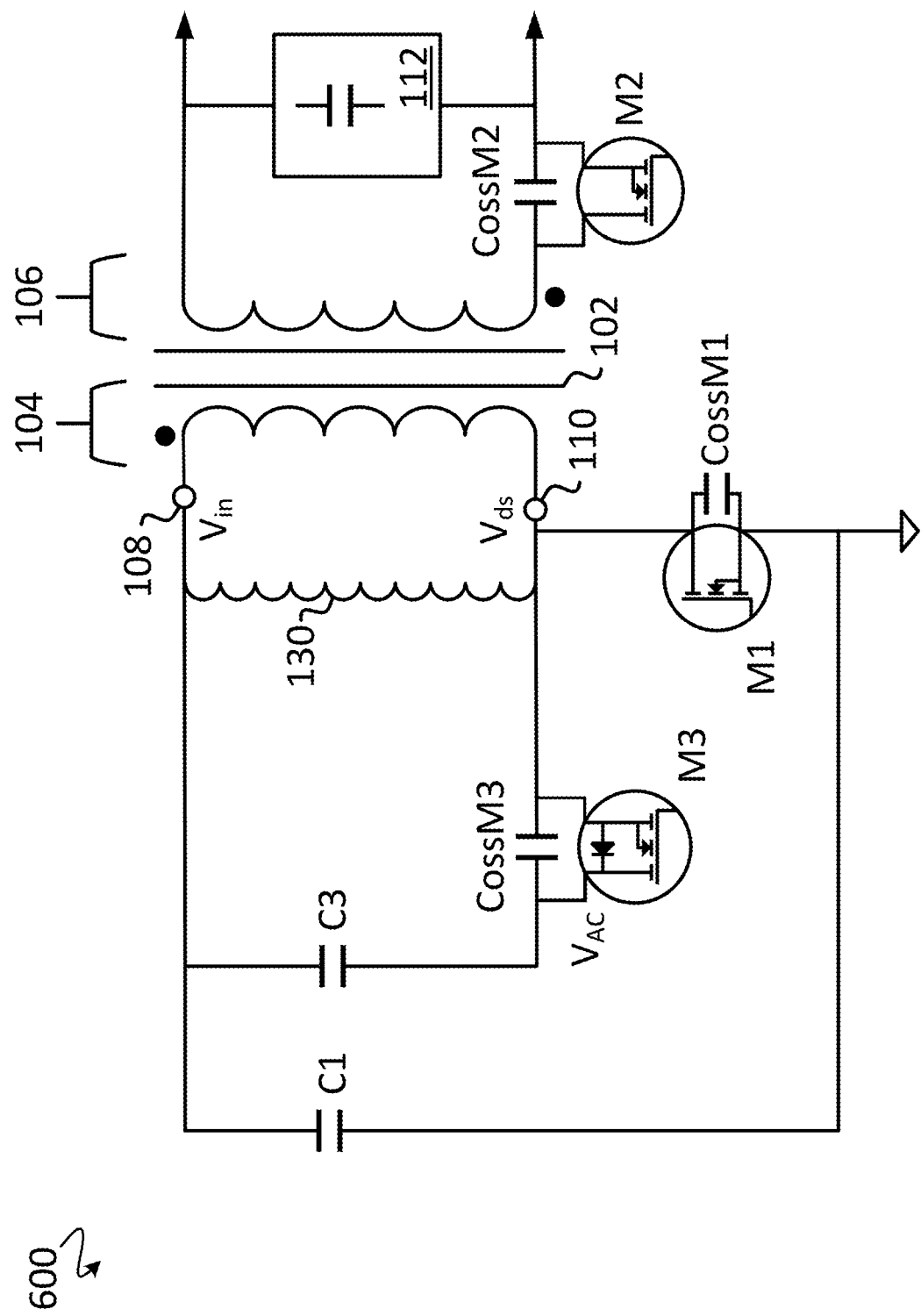
FIG. 6 is a simplified circuit schematic of a portion of a power converter with a self-driven active clamp circuit, in accordance with some embodiments.
Figure 8:
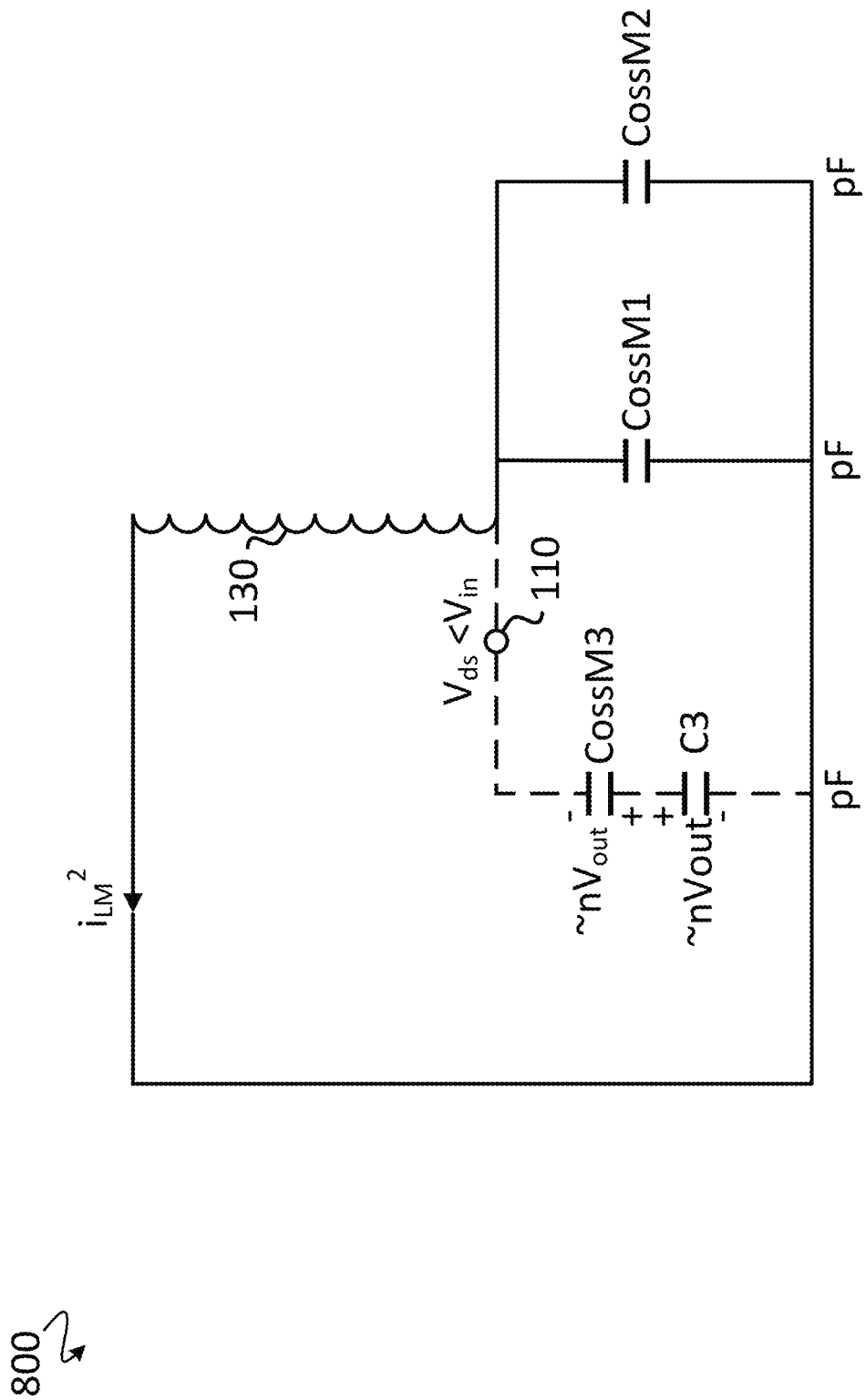
FIG. 8 is a simplified circuit schematic of a portion of a power converter with a self-driven active clamp circuit, in accordance with some embodiments.

FIGS. 6-8 highlight parasitic capacitive and inductive elements of the converter 200 which resonate during quasi-resonant operation of the converter 200, a portion of the switching cycle when the main switch M1 and the synchronous rectifier switch M2 are both off. A simplified circuit schematic 600 of FIG. 6 includes elements of the converter 200 introduced in FIG. 2, as well as a representation of magnetizing inductance L$_M$ 130, parasitic capacitance CossM3 of the active clamp switch M3, parasitic capacitance CossM1 of the main switch M1, and parasitic capacitance CossM2 of the synchronous rectifier switch M2. Also shown is an active clamp switch voltage V$_{AC}$ which is a drain-source voltage of the active clamp switch M3. The dominant capacitive elements along with the range of their capacitance values for two different active clamp switch voltages are illustrated in the simplified circuit schematics 700, 800 of FIGS. 7-8, respectively.

The simplified circuit schematic 700 of FIG. 7 illustrates particular capacitive and inductive elements of the converter 200 during a portion of the switching cycle when the voltage across the capacitance CossM3 is approximately equal to zero volts, the voltage across the active clamp capacitor C3 is approximately equal to nV$_{out}$, and the voltage V$_{ds}$ at node 110 is equal to V$_{in}$+nV$_{out}$. At this time, the combined capacitance of the active clamp capacitor C3 and the parasitic capacitance CossM3 of the active clamp switch M3 is on the order of nanofarads. The parasitic capacitance CossM1 of the main switch M1 is on the order of picofarads, and the parasitic capacitance CossM2 of the synchronous rectifier switch M2 is on the order of picofarads.

The simplified schematic 800 of FIG. 8 illustrates particular capacitive and inductive elements of the converter 200 during a portion of the switching cycle when the voltage across the capacitance CossM3 is approximately equal to negative nV$_{out}$, and the voltage across the active clamp capacitor C3 is approximately equal to nV$_{out}$, resulting in the voltage V$_{ds}$ at node 110 being less than the input voltage V$_{in}$. During this portion of the switching cycle, the active clamp capacitor C3 voltage is significantly larger than the reflected output voltage nVout. The combined capacitance of the active clamp capacitor C3 and the parasitic capacitance CossM3 of the active clamp switch M3 is on the order of picofarads. The parasitic capacitance CossM1 of the main switch M1 is on the order of picofarads, and the parasitic capacitance CossM2 of the synchronous rectifier switch M2 is on the order of picofarads. A current $i_{LM}^2$ of the magnetizing inductance 130 is also shown.

The large difference in the capacitive values is important because the initial large effective capacitance leads to higher magnetizing inductance current (during LC resonance):

$$I_{pk} = V_{peak} \times \sqrt{\frac{C_{eq}}{L_M}} \quad \text{(Equation 4)}$$

where V$_{peak}$ is equal to the reflected voltage nV$_{out}$ on the primary side of the transformer 102, L$_M$ is the magnetizing inductance 130, and Ceq is the equivalent capacitance of the intended and parasitic capacitances as seen at node 110 shown in FIGS. 6-8. The large difference in the capacitive values occurs due to a large active clamp FET output capacitance CossM3 of the active clamp switch M3 when its drain-source voltage is zero, which is only the case when the active clamp circuit 214 is enabled (e.g., when energy stored in the active clamp capacitor C3 is recycled during each switching cycle).

A simplified graph 900 of FIG. 9A illustrates voltage V$_{ds}$ at node 110 and a magnetizing inductance current $i_{LM}$ ($i_{LM}^{1-2}$) of the magnetizing inductance 130 over time t during a quasi-resonant operation of the converter 200, in accordance with some embodiments. A simplified graph 950 of FIG. 9B is a plot of voltage V$_{ds}$ and current $i_{LM}$ over time t during a quasi-resonant portion of the switching cycle for a conventional lossy RCD snubber circuit. The simplified graph 900 illustrates the non-linear effect of Equation 4 when the active clamp capacitor C3 voltage V$_{AC}$ is approximately equal to the reflected output voltage (e.g., V$_{AC}$~nV$_{out}$), as compared to the simplified graph 950 which illustrates a conventional lossy snubber operation where the snubber capacitor voltage is significantly greater than the reflected output voltage (e.g., V$_{AC}$>1.5×nV$_{out}$).

As shown in the simplified graph 900, the active clamp circuit 214 allows for a higher magnetizing current $i_{LM}$ as compared to the conventional lossy snubber circuit shown in the simplified graph 950. The higher magnetizing current $i_{LM}$, in turn, enables more charge to be removed from the main switch M1, thus leading to lower drain-source voltages $V_{ds}$ during quasi-resonant operation of the converter 200.

Figure 10:
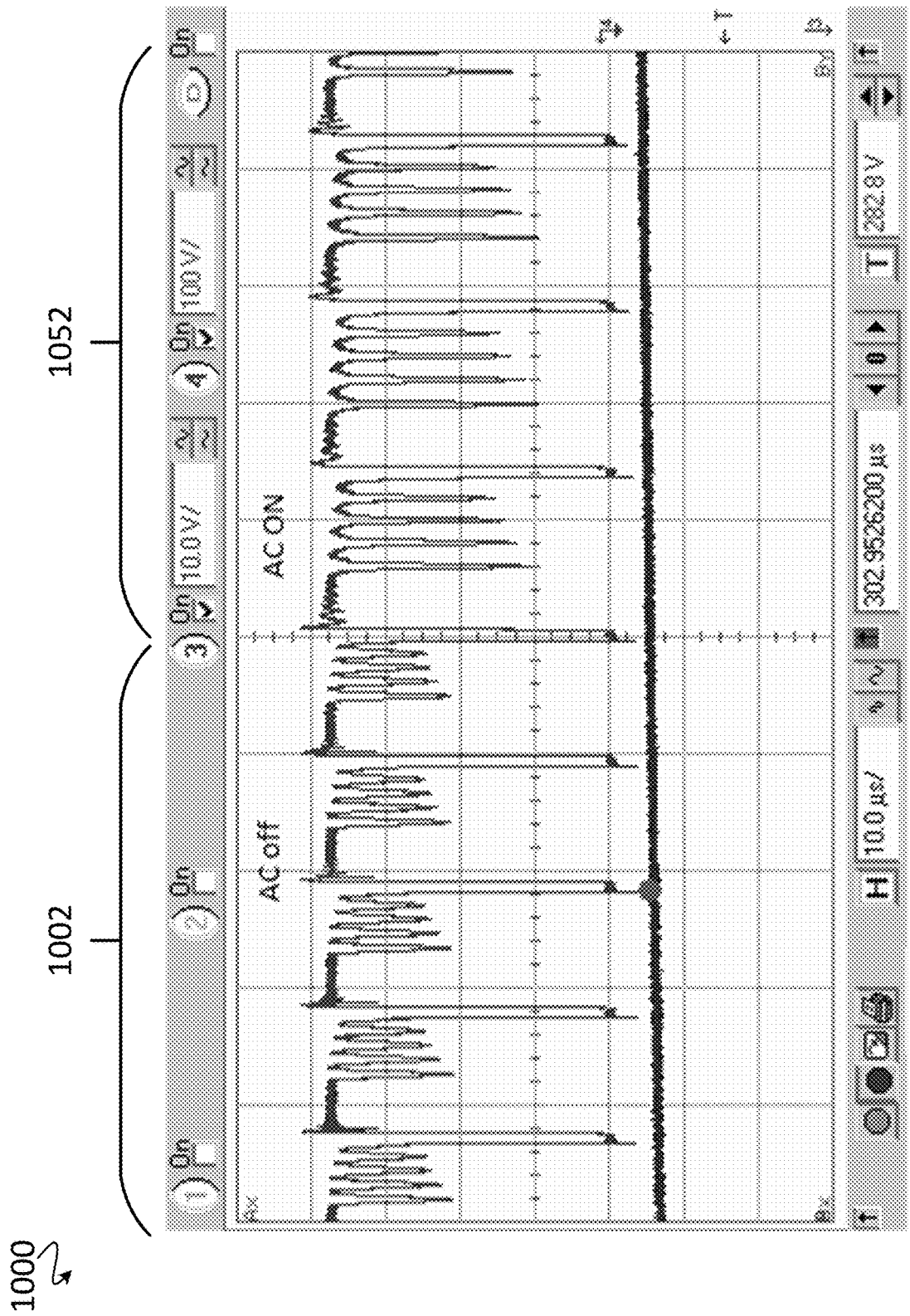
FIG. 10 is a screenshot showing experimental results of a power converter with a self-driven active clamp circuit, in accordance with some embodiments.

FIG. 10 is a screenshot 1000 of experimental results of $V_{ds}$ over time for a converter 200 having an active clamp circuit 214, in accordance with some embodiments. A first portion 1002 of the screenshot 1000 shows voltage $V_{ds}$ at node 110 during operation of the converter 200 when the active clamp circuit 214 is disabled. A second portion 1052 of the screenshot 1000 shows voltage $V_{ds}$ at node 110 during operation of the converter 200 when the active clamp circuit 214 is enabled and the active clamp capacitor voltage VAC is approximately equal to the reflected output voltage nVout. As shown, when the active clamp 214 is enabled, the main switch M1 drain-source voltage at the valleys is significantly smaller (e.g., 100 Vdc vs. 225 Vdc at the first valley; 125 Vdc vs. 240 Vdc at the second valley and etc.). The benefit of the reduced valley voltage is due to the reduced main switch CossM1 energy dissipated, which is a function of the voltage squared, when the main switch M1 is turned on.

Figure 11:
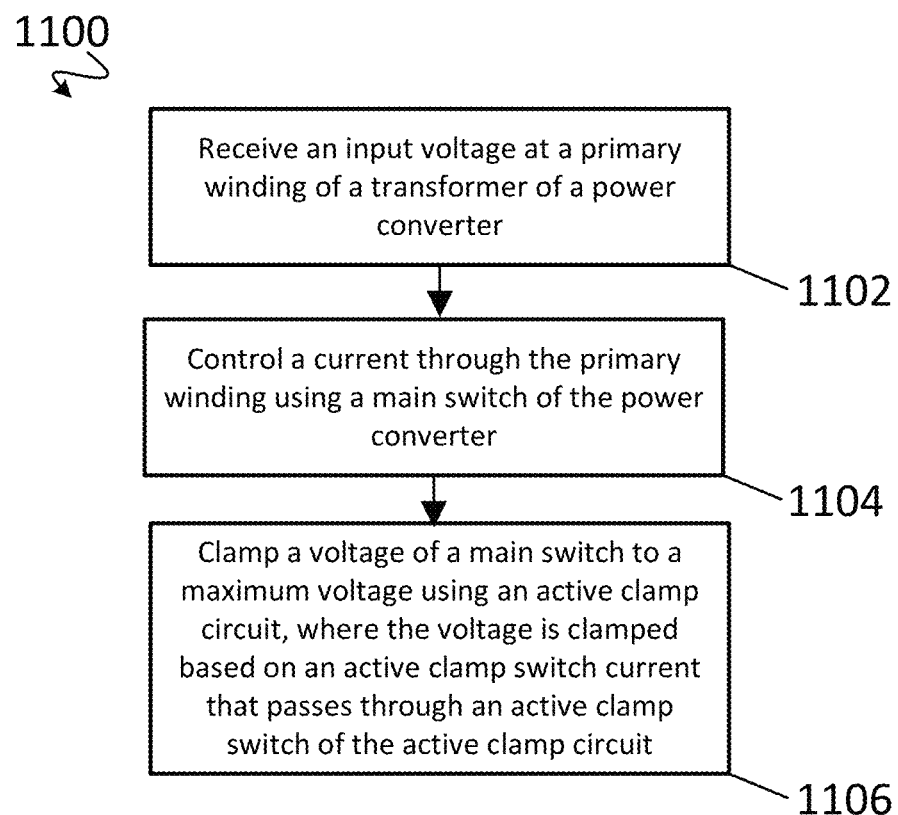
FIG. 11 is a portion of a process for clamping a voltage of a main switch of a power converter using a self-driven active clamp circuit, in accordance with some embodiments.
Figure 12:
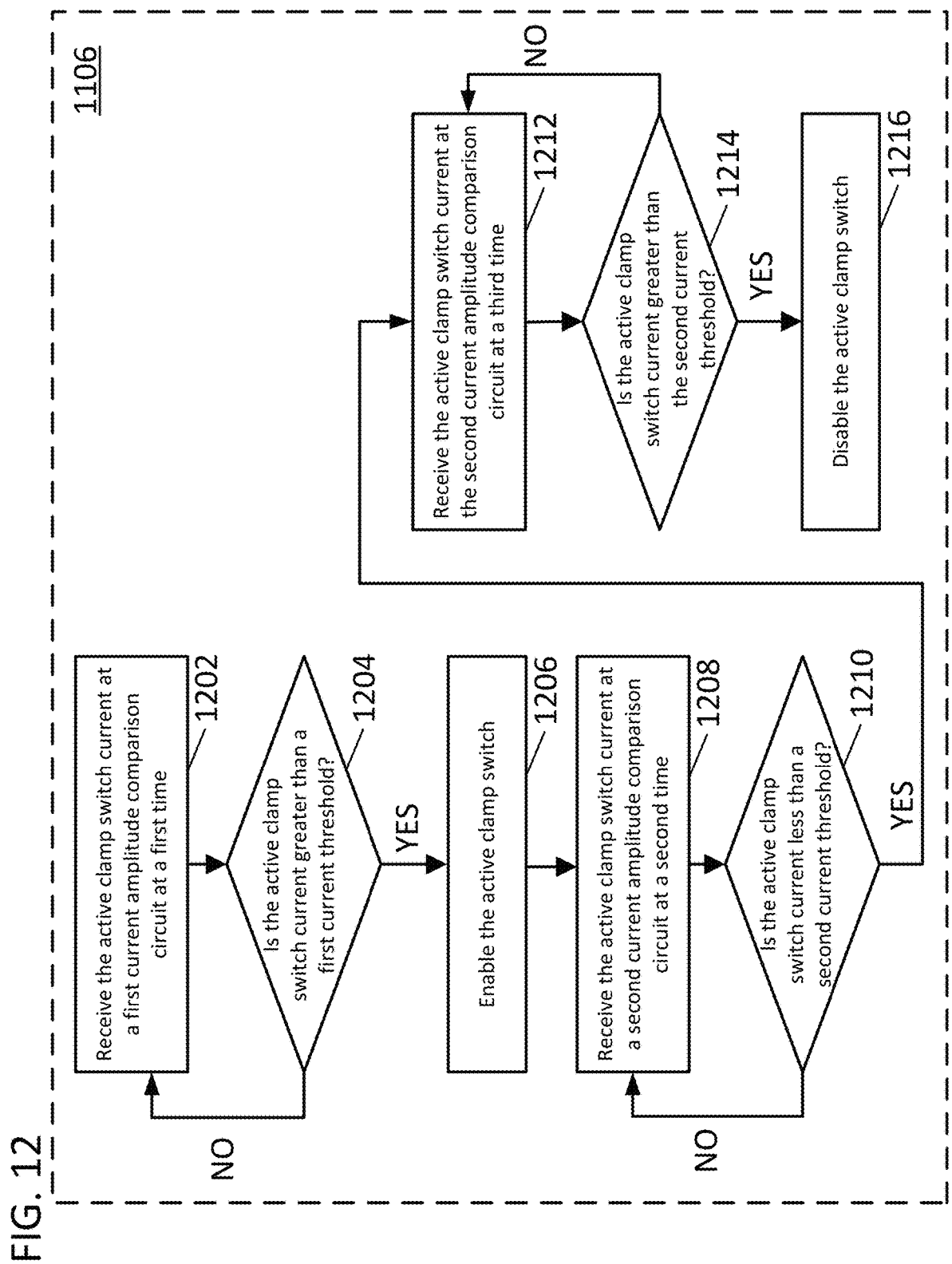
FIG. 12 is a portion of a process for clamping a voltage of a main switch of a power converter using a self-driven active clamp circuit, in accordance with some embodiments.

FIG. 11 is a portion of an example process for clamping a voltage of a main switch of a power converter (e.g., the power converter 200), in accordance with some embodiments. The particular steps, order of steps, and combination of steps are shown for illustrative and explanatory purposes only. Other embodiments can implement different particular steps, orders of steps, and combinations of steps to achieve similar functions or results. At step 1102, an input voltage is received at a primary winding (104) of a transformer (102) of the power converter (200). At step 1104, a current through the primary winding (104) is controlled using a main switch (M1) of the power converter (200). At step 1106, a voltage of the main switch (e.g., at node 110) is clamped to a maximum voltage using an active clamp circuit (214). The voltage of the main switch (M1) is clamped based on an active clamp switch current (iso) that passes through an active clamp switch (M3) of the active clamp circuit (214). Details of step 1106 are presented in FIG. 12, in accordance with some embodiments. The particular steps, order of steps, and combination of steps are shown for illustrative and explanatory purposes only. Other embodiments can implement different particular steps, orders of steps, and combinations of steps to achieve similar functions or results.

At step 1202, the active clamp switch current (iso) is received at a first current amplitude comparison circuit (304) at a first time. At step 1204, it is determined, using the first current amplitude comparison circuit, if the active clamp switch current is greater than a first current threshold (320) (e.g., 100 mA). If it is determined at step 1204 that the active clamp switch current is not greater than the first current threshold, flow returns to step 1202. If it is determined at step 1204 that the active clamp switch current is greater than the first current threshold (e.g., a body-diode of the active clamp switch M3 is conducting), flow continues to step 1206. At step 1206, the active clamp switch (M3) is enabled (e.g., turned on), thereby clamping a voltage at the main switch (M1). At step 1208, the active clamp switch current is received at a second current amplitude comparison circuit (306) at a second time. At step 1210, it is determined, using the second current amplitude comparison circuit, if the active clamp switch current is less than a second current threshold (322) (e.g., −50 mA). If it is determined at step 1210 that the active clamp switch current is not less than the second current threshold, flow returns to step 1208. If it is determined at step 1210 that the active clamp switch current is less than the second current threshold (e.g., a first zero crossing of the active clamp switch current), flow continues to step 1212. At step 1212, the active clamp switch current is received at the second current amplitude comparison circuit at a third time. At step 1214, it is determined, using the second current amplitude comparison circuit, if the active clamp switch current is greater than the second current amplitude comparison circuit. If it is determined at step 1214 that the active clamp switch current is not greater than the second current threshold, flow returns to step 1212. If it is determined at step 1214 that the active clamp switch current is greater than the second current threshold (e.g., a second zero crossing of the active clamp switch current), flow continues to step 1216. At step 1216, the active clamp switch (M3) is disabled (e.g., it is turned off). When the active clamp switch is turned off, the active clamp circuit (214) is no longer clamping a voltage of a main switch (M1) of the power converter (200).

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only and is not intended to limit the invention.

What is claimed is:

1. A method comprising:
    receiving, at an active clamp controller circuit, an active clamp switch current that passes through an active clamp switch, the active clamp switch being coupled in series with an active clamp capacitor;
    enabling, using the active clamp controller circuit, the active clamp switch based on a first amplitude comparison, the first amplitude comparison being based on the active clamp switch current; and
    disabling, using the active clamp controller circuit, the active clamp switch based on a second amplitude comparison and a third amplitude comparison, the second amplitude comparison and the third amplitude comparison being based on the active clamp switch current.

2. The method of claim 1, further comprising:
    receiving, at an active clamp switch controller circuit, a first comparison signal based on the first amplitude comparison;
    receiving, at the active clamp switch controller circuit, a second comparison signal based on the second amplitude comparison;

receiving, at the active clamp switch controller circuit, a third comparison signal based on the third amplitude comparison; and generating, using the active clamp switch controller circuit, an active clamp switch control signal to control the active clamp switch, the active clamp switch control signal being generated by the active clamp switch controller circuit based on the first comparison signal, the second comparison signal, and the third comparison signal.

3. The method of claim 2, further comprising:

receiving, at a first amplitude comparison circuit, the active clamp switch current;

performing, using the first amplitude comparison circuit, the first amplitude comparison;

generating, using the first amplitude comparison circuit, the first comparison signal based on the first amplitude comparison;

receiving the first comparison signal at the active clamp switch controller circuit; and enabling, using the active clamp switch controller circuit, the active clamp switch in response to receiving the first comparison signal.

4. The method of claim 3, wherein:

the first amplitude comparison comprises comparing, by the first amplitude comparison circuit, an amplitude of the active clamp switch current to a first current amplitude threshold; and the first comparison signal is generated in response to determining, by the first amplitude comparison circuit, that the amplitude of the active clamp switch current is greater than the first current amplitude threshold.

5. The method of claim 3, further comprising:

receiving, at a second amplitude comparison circuit, the active clamp switch current;

performing, using the second amplitude comparison circuit, the second amplitude comparison and the third amplitude comparison;

generating, using the second amplitude comparison circuit, the second comparison signal and the third comparison signal based on the second amplitude comparison and the third amplitude comparison;

receiving the third comparison signal at the active clamp switch controller circuit; and disabling, using the active clamp switch controller circuit, the active clamp switch in response to receiving the third comparison signal.

6. The method of claim 5, wherein:

the second amplitude comparison comprises detecting, by the second amplitude comparison circuit, a first zero crossing of the active clamp switch current;

the third amplitude comparison comprises detecting, by the second amplitude comparison circuit, a second zero crossing of the active clamp switch current; and the method further comprises:

generating, by the second amplitude comparison circuit, the second comparison signal in response to detecting the first zero crossing of the active clamp switch current; and generating, by the second amplitude comparison circuit, the third comparison signal in response to detecting the second zero crossing of the active clamp switch current.

7. The method of claim 6, wherein:

detecting the first zero crossing of the active clamp switch current comprises comparing, by the second amplitude comparison circuit, an amplitude of the active clamp switch current to a second current amplitude threshold at a first time; and detecting the second zero crossing of the active clamp switch current comprises comparing, by the second amplitude comparison circuit, the amplitude of the active clamp switch current to the second current amplitude threshold at a second time.

8. The method of claim 3, further comprising:

clamping, by the active clamp switch, a voltage at a node of another switch to a maximum voltage, the active clamp switch being coupled to the node of the other switch.

9. The method of claim 8, wherein:

the node of the other switch is coupled to a winding of a transformer; and the active clamp switch current is a current that flows bi-directionally, through the active clamp switch, between the winding of the transformer and the active clamp capacitor.

10. The method of claim 1, further comprising:

determining, by the active clamp controller circuit, that a voltage amplitude of a switch voltage is less than a voltage threshold; and disabling, by the active clamp controller circuit, the active clamp switch in response determining that the voltage amplitude of the switch voltage is less than the voltage threshold, irrespective of the first amplitude comparison.

11. The method of claim 10, further comprising:

receiving, at a voltage comparison circuit, the switch voltage;

generating, using the voltage comparison circuit, a voltage comparison signal based on a comparison between the switch voltage and the voltage threshold, the switch voltage being a voltage developed at a node of another switch;

disabling, by the active clamp controller circuit, the active clamp switch in response to the voltage comparison signal when the voltage comparison signal indicates that the switch voltage does not surpass the voltage threshold; and not disabling, by the active clamp controller circuit, the active clamp switch in response to the voltage comparison signal when the voltage comparison signal indicates that the switch voltage surpasses the voltage threshold.

12. A method comprising:

receiving, at a power converter circuit, an input voltage from a voltage source;

converting, by the power converter circuit, the input voltage to an output voltage, the power converter circuit comprising a transformer having a primary winding and a secondary winding, a first winding node of the primary winding being coupled to the voltage source to receive the input voltage;

controlling, by a main switch of the power converter circuit, a current through the primary winding, the main switch being coupled to a second winding node of the primary winding;

receiving, at an active clamp controller circuit, an active clamp switch current that passes through an active clamp switch, the active clamp switch being coupled in series with an active clamp capacitor;

enabling, using the active clamp controller circuit, the active clamp switch based on a first amplitude comparison that is based on the active clamp switch current; and disabling, using the active clamp controller circuit, the active clamp switch based on a second amplitude comparison and a third amplitude comparison, the second amplitude comparison and the third amplitude comparison being based on the active clamp switch current.

13. The method of claim 12, further comprising:

receiving, at an active clamp switch controller circuit, a first comparison signal based on the first amplitude comparison;

receiving, at the active clamp switch controller circuit, a second comparison signal based on the second amplitude comparison;

receiving, at the active clamp switch controller circuit, a third comparison signal based on the third amplitude comparison; and generating, by the active clamp switch controller circuit, an active clamp switch control signal to control the active clamp switch, the active clamp switch control signal being generated by the active clamp switch controller circuit based on the first comparison signal, the second comparison signal, and the third comparison signal.

14. The method of claim 13, further comprising:

receiving, at a first amplitude comparison circuit, the active clamp switch current;

performing, using the first amplitude comparison circuit, the first amplitude comparison by comparing an amplitude of the active clamp switch current to a first current amplitude threshold;

generating, using the first amplitude comparison circuit, the first comparison signal upon determining, by the first amplitude comparison circuit, that the amplitude of the active clamp switch current is greater than the first current amplitude threshold; and enabling, using the active clamp switch controller circuit, the active clamp switch in response to receiving the first comparison signal.

15. The method of claim 14, further comprising:

receiving, at a second amplitude comparison circuit, the active clamp switch current;

performing, using the second amplitude comparison circuit, the second amplitude comparison, the second amplitude comparison comprising detecting a first zero crossing of the active clamp switch current;

generating, using the second amplitude comparison circuit, the second comparison signal in response to detecting the first zero crossing of the active clamp switch current;

performing, using the second amplitude comparison circuit, the third amplitude comparison, the third amplitude comparison comprising detecting a second zero crossing of the active clamp switch current;

generating, using the second amplitude comparison circuit, the third comparison signal in response to detecting the second zero crossing of the active clamp switch current; and disabling, by the active clamp switch controller circuit, the active clamp switch in response to receiving the third comparison signal.

16. The method of claim 15, wherein:

detecting the first zero crossing of the active clamp switch current comprises comparing, by the second amplitude comparison circuit, the amplitude of the active clamp switch current to a second current amplitude threshold at a first time; and detecting the second zero crossing of the active clamp switch current comprises comparing, by the second amplitude comparison circuit, the amplitude of the active clamp switch current to the second current amplitude threshold at a second time.

17. The method of claim 12, further comprising:

disabling, using the active clamp controller circuit, the active clamp switch in response determining that a switch voltage developed at a node of the main switch is less than a voltage threshold, irrespective of the first amplitude comparison.

18. The method of claim 17, further comprising:

receiving, by a voltage comparison circuit, the switch voltage;

outputting, by the voltage comparison circuit, a voltage comparison signal based on a comparison between the switch voltage and the voltage threshold;

disabling the active clamp switch in response to the voltage comparison signal when the voltage comparison signal indicates that the switch voltage does not surpass the voltage threshold; and not disabling the active clamp switch in response to the voltage comparison signal when the voltage comparison signal indicates that the switch voltage surpasses the voltage threshold.

* * * * *